Feb. 6, 1923. 1,444,721.
F. C. ZUMDAHL.
GEAR CHUCK.
FILED JUNE 26, 1920.
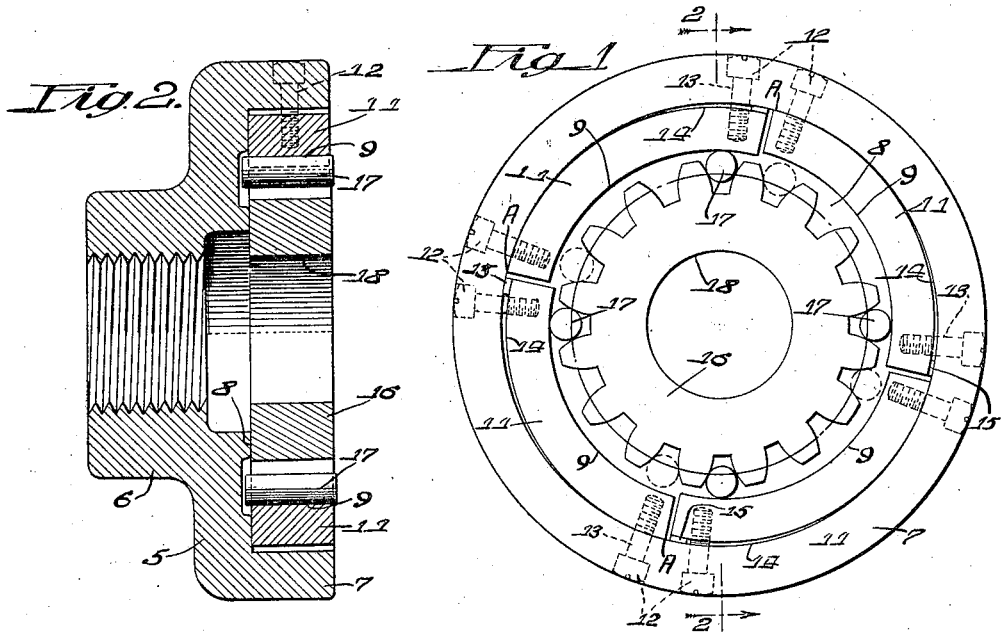
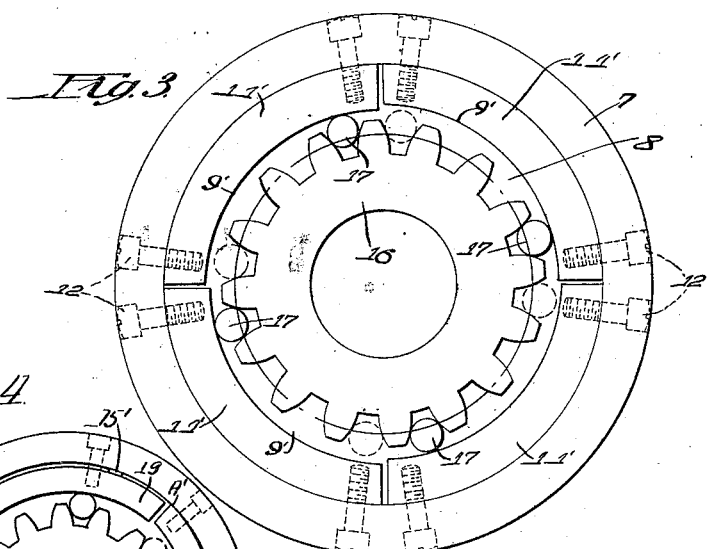
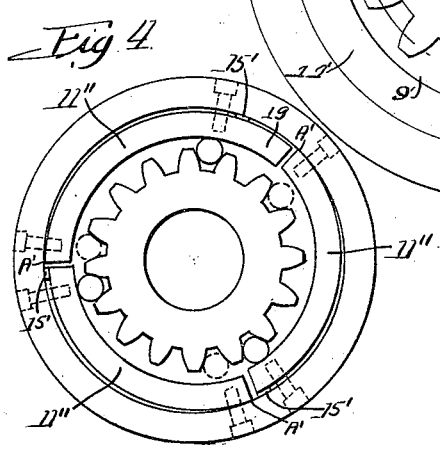
Inventor
Frederick C. Zumdahl
By Ira J. Wilson
Atty.

Patented Feb. 6, 1923.

1,444,721

UNITED STATES PATENT OFFICE.

FREDERICK C. ZUMDAHL, OF ROCKFORD, ILLINOIS, ASSIGNOR TO CHARLES COTTA, OF ROCKFORD, ILLINOIS.

GEAR CHUCK.

Application filed June 26, 1920. Serial No. 391,987.

*To all whom it may concern:*

Be it known that I, FREDERICK C. ZUMDAHL, a citizen of the United States, residing at Rockford, in the county of Winnebago and State of Illinois, have invented certain new and useful Improvements in Gear Chucks, of which the following is a specification.

This invention pertaining in general to machine chucks, has more particular reference to that type especially adapted for centering, gripping and rotating a gear.

In the manufacture of gears, especially of the spur type, after they have been machined and heat-treated, it is desired to rebore them by grinding. In this operation, it is essential that the bore shall be ground as truly coaxial with respect to the gear teeth as possible; and the matter of centering a gear to a high degree of accuracy and securely holding it in such position during the grinding operation, I have aimed by the present invention to attain in a novel and exceptionally simple and practical manner.

It frequently happens as a result of the heat-treating process that a gear has become slightly distorted and for this reason it has been difficult to so support the gear that in every instance its bore will be ground in as true co-axial relation to the gear teeth as possible. In the present invention, I reduce such possiblity of error to a minimum. That is, I have designed a gear chuck of novel construction on the theory that since a gear is designed principally from the pitch line, the variation if any, after the heat treatment will be less at the pitch line or in the immediate vicinity thereof than at any other portion of the gear teeth. Consequently, I employ single gripping members, spaced at proper intervals about a gear and engaged between two teeth approximately on the pitch line thereof, so as to center the gear with precision and hold it rigidly during the grinding operation.

Another object is to provide a gear chuck of the character described constructed in such simple manner as to comprise but comparatively few parts so shaped as to be capable of production at low cost and to serve the desired purposes in a practical and efficient manner.

Other objects and attendant advantages will be appreciated as the invention becomes better understood by reference to the following description when considered in connection with the accompanying drawings, in which—

Figure 1 is a face view of a gear chuck embodying my improvements;

Fig. 2, a sectional view taken on the line 2—2 of Fig. 1; and

Figs. 3 and 4, face views of modified forms of my invention.

As a working example of my improvements, I have shown them embodied in a chuck of that type in which the body is adapted to be threadingly engaged and secured on a spindle, although the chuck body might be otherwise suitably secured to an arbor or mandrel. The chuck body, designated generally by reference character 5, is shaped to provide a threaded hub 6 and a peripheral flange 7 reaching out from the face 8.

In this embodiment of my improvements, the flange 7 serves as a means of support for a plurality of cam-faces 9 formed on segmental blocks 11, which are attached at each end of the flange by screws 12. It will be observed that the screws are loose in the openings 13 through the flange and threaded into the blocks, and that the blocks are uniform in all dimensions. That is, the inner and outer faces 9 and 14 respectively, of all blocks shown in Fig. 1, are similar radii, the blocks are of equal length, and the screws 12 for each block are spaced equi-distant apart. The spacing of these screws is not, however, important. But, to obtain uniform eccentricity of the several segmental blocks 11, it is essential that the shims 15 shall be placed equi-distant from the initial point of bearing (designated by A) of its respective block against the peripheral flange 7. It follows, therefore, that by inserting a shim or spacer 15 between a common end of each block and the flange 7 and drawing the screw 12 tight, the internal cam-faces 9 will be uniformly eccentrically disposed, and will have a gradual pitch and be of such length as to accommodate a reasonable variation in the diameter of gears.

Within the segmental blocks the gear 16 to be ground is placed, and between certain teeth and the cam faces are inserted suitable spacer-driving members 17, at present in the form of rollers. In this case, the number of teeth on the gear is a multiple of two, consequently four rollers and segmental blocks are used, the rollers being spaced equi-distant about the gear, that is, with four teeth between each roller. When the rollers have been inserted in the dotted line position shown in Fig. 1, the gear and chuck body may be relatively rotated, the latter in a counter-clockwise direction, thereby causing the rollers to be advanced along the respective cam-faces and forced thereby into a wedging engagement with the engaged gear teeth. In view of the uniformity in the shape and arrangement of the cam faces and rollers, the gear will be accurately centered by this action and rigidly and securely held in the chuck body. It will be noted that these rollers are of such diameter as to engage the gear teeth approximately on the pitch line thereof. Consequently, any distortion of the gear as a result of the heat treatment will be reduced to a minimum as regards positioning the gear in a true co-axial relation to the chuck, so that the bore 18 will be ground co-axial with the gear teeth.

In Fig. 3, I have shown a modified form of the invention, in which the segmental blocks 11' are shaped to provide the requisite cam-faces. These blocks are respectively clamped throughout their peripheral faces to the flange 7, and their inner cam-faces are eccentrically disposed, similarly to the faces 9 of the blocks 11. The blocks 11' are so shaped by inserting a shim between one end of each block and the flange 7 and turning or grinding the combined inner faces 9' to a true circle. It will be here noted as in the first illustration, that it is essential that the shims shall be properly and equally spaced with respect to the initial bearing point of the blocks against the flange 7, while machining the cam-faces in order to effect the proper eccentricity. Then upon removing the shims and drawing the screws 12 tight as shown in Fig. 3, the cam-faces 9' will have the desired gradual pitch. The operation of centering, gripping and driving the gear in this case is the same as described above with reference to the blocks 11.

In the event that the gear has an uneven number of teeth or that the number of teeth do not divide equally by the segmental blocks employed, as shown in Fig. 4, the shims 15' would be spaced equi-distant from the initial bearing or contact points A' of the respective blocks 11''. This produces uniform eccentricity of the blocks, the portion 19 of the longest block being merely an idle overhang.

It will be observed from the foregoing that it is important that the relation between each roller or spacer-driving member and its cam-face shall be the same. This is obtained in the present examples by positioning the shims 15 equi-distant from the initial bearing point of the respective cam blocks against the supporting body or flange 7. In the event that the gear to be ground has an odd number of teeth, requiring uneven spacing of the rollers, this relation between the rollers and cam-faces is maintained as explained above, by the proper positioning of the shims to secure the proper eccentricity of such cam-faces. The spacer-driving members 17 need not necessarily be in the form of rollers, and it is not essential that they engage the gear teeth on the pitch line. This particular construction, is however, practical and serves well the purposes of this invention. It should be understood, therefore, that in the use of my improvements various changes might be made in the construction without departing from the spirit and scope of the invention as expressed in the appended claims, in which—

I claim:

1. In a gear chuck of the character described, the combination of a chuck body, cam surfaces thereon of uniform eccentricity, and a roller interposed between each cam surface and adjoining teeth of a centrally disposed gear, said rollers engaging the teeth on the pitch line and adapted to be advanced along said cam surfaces by relative rotation of the chuck body and gear for automatically bringing the gear into true co-axial relation to the chuck and for establishing driving connection therewith.

2. In a gear chuck of the character described, the combination of a chuck body, circumferentially arranged cam surfaces on said body of uniform eccentricity and each bearing identical relation to the axis of rotation of the chuck, and a roller positioned between each cam surface and adjoining teeth of a centrally disposed gear, each roller being of such diameter as to engage said teeth on the pitch diameter of the gear and being free to move bodily along its cam surface by relative rotation between the gear and chuck body for bringing the gear into true co-axial relation to said body and for establishing driving connection therewith.

3. In a gear chuck of the character described, the combination of a chuck body having an annular flange, a plurality of segmental blocks arranged within said flange so as to circumscribe a gear to be driven, a screw connecting each end portion of each block to said flange, the inner surface of each block being eccentric to the chuck axis, and a roller disposed between each eccentric surface and two adjoining teeth of said gear and adapted by relative rotation of said chuck body and gear to be bodily advanced along said surface for centering and driving the gear, the screw at a common end of each block being adjustable to vary the eccentricity thereof.

4. A gear chuck of the character described comprising a body having a peripheral flange, a plurality of segmental blocks detachably secured to and at the inner side of said flange and having internal cam-faces eccentric with respect to the chuck axis, a roller operative between each cam-face and two adjoining gear teeth, whereby upon relative rotation between said body and gear in the proper direction the rollers will be advanced in a wedging engagement with said cam-faces and gear teeth, thereby centering and gripping the gear in driving connection.

5. In a gear chuck of the character described, the combination of a chuck body, a plurality of segmental blocks each having an inner and an outer concentric surface, said blocks positioned in circumferential order on said body with their inner surfaces uniformly eccentric thereto, and a spacer-driving member positioned between each eccentric surface and adjoining teeth of a gear disposed between said blocks and adapted to be advanced along said eccentric surface for centering and driving the gear.

6. In a gear chuck of the character described, a chuck body having an annular flange, a plurality of segmental blocks secured to said flange and a shim between one end of each block and the flanges to give eccentricity to the block, the distance between each shim and its initial point of contact with the flange being equi-distant, whereby to secure uniform eccentricity of said blocks.

7. In a gear chuck of the character described, the combination of the chuck body, segmental blocks detachably secured thereto each having a cam surface of uniform eccentricity, and a roller positioned between each cam surface and adjoining teeth of a centrally disposed gear, each roller being free to move bodily along said cam surface by relative rotation between the gear and chuck body for bringing the gear into true co-axial relation to said body for establishing driving connection therewith.

8. A gear chuck of the character described comprising a chuck body having an annular internal surface concentric with the chuck axis, a plurality of segmental blocks each having an inner and an outer concentric surface, means for supporting said blocks on the chuck body in circumferential order inside of said annular surface with a common end of each block bearing against said surface and the opposite end spaced inwardly therefrom for making said inner surfaces uniformly eccentric, and a spacer-driving member between each eccentric surface and adjoining teeth of a centrally disposed gear for centering the gear by relative rotation of the chuck body and gear in a direction to advance said members along said eccentric surfaces and for establishing driving connection between the said body and gear.

9. In a gear chuck, the combination of a body having a concentric supporting part, a plurality of segmental blocks in circumferential order within said supporting part, a screw connecting each block to said supporting part and adapted for radially adjusting one end of the block with respect to the other for varying the eccentricity of the inner surface of the block, and a spacer-driving member positioned between each eccentric surface and adjoining teeth of a centrally disposed gear and adapted to be bodily advanced along such surface by relative rotation of the gear and chuck body for centering the gear and establishing driving connection therewith.

10. In a gear chuck, the combination of a chuck body, a plurality of segmental cam blocks in circumferential order thereon, a removable spacer element between one end of each block and said body for determining the eccentricity of the inner surface of the block, and a roller positioned between each cam block and adjoining teeth of a centrally disposed gear and adapted to be bodily advanced along such surface by relative rotation of the gear and chuck body for centering the gear and establishing driving connection therewith.

11. In a gear chuck of the character described, the combination of a chuck body, eccentric cam surfaces in circumferential order on said body, said cam surfaces being of uniform eccentricity, and a roller adapted to be positioned between each cam surface and adjoining teeth of a centrally disposed gear, each roller engaging said teeth substantially on the pitch diameter thereof and being unattached to the chuck and free to be bodily advanced along its cam surface by relative rotation of the gear and the chuck body for bringing the gear into approximately true concentric relation with said body and for driving the gear.

FREDERICK C. ZUMDAHL.